Patented Mar. 26, 1940

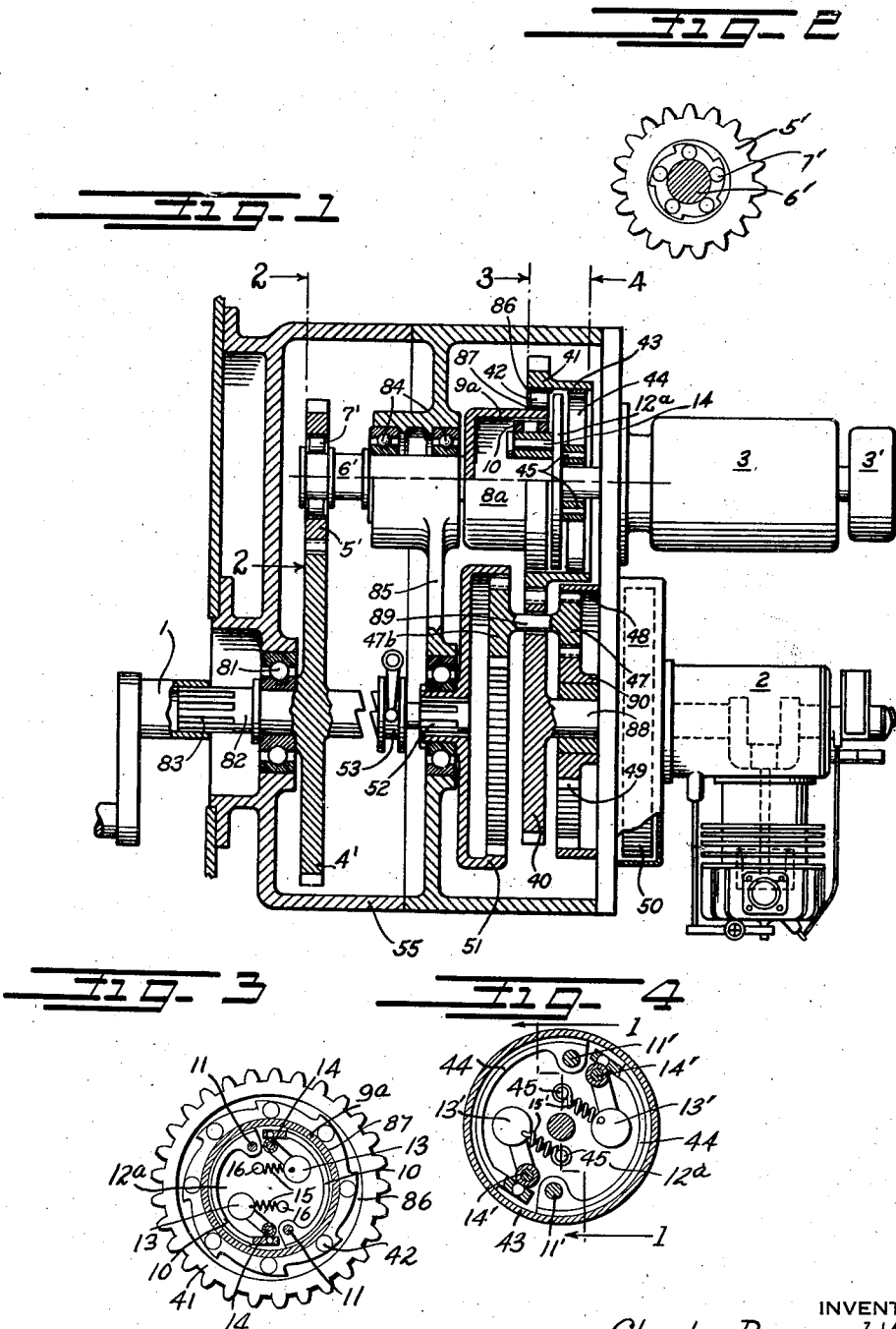

2,195,139

UNITED STATES PATENT OFFICE 2,195,139

DRIVING MECHANISM

Charles Raymond Waseige, Rueil-Malmaison, France, assignor to Societe Anonyme Air Equipment, Bellancourt, Seine, France, a society of France Application May 4, 1938, Serial No. 206,063, now Patent No. 2,154,591, dated April 18, 1939, which is a division of application Serial No. 69,558, March 18, 1936, now Patent No. 2,123,219, dated July 12, 1938. Divided and this application February 23, 1939, Serial No. 258,047. In France March 29, 1935

2 Claims. (Cl. 60—97)

This invention relates to aircraft, and particularly to the means for propulsion and current generation.

In my Patent No. 2,123,219, granted July 12, 1938, I have disclosed the details of one embodiment of means for operating one or more accessory units when the propelling motor is not in use, and chiefly to assure the constant supply of necessary current, without requiring the use of a storage battery or of an auxiliary apparatus, and preferably with the use of the accessories usually employed with the aircraft motor, i. e., starting motor and generator.

The present invention is exemplified in a different embodiment of means directed to the same end and, as in my prior patent, includes a combination of at least three units, that is, a propelling motor for the aircraft, an auxiliary motor, and one or more accessories such as an electric generator, a vacuum or liquid pump, a winch, or the like, the combination being characterized by the fact that the accessory device or devices, which may be connected to the propelling motor by transmission gear, also have connection with the auxiliary motor, and there may also be included means for utilizing the said auxiliary motor as the agency for initial rotation ("starting") of the propelling motor of the aircraft.

In all such cases, it is advantageous to provide means which assure, if the propelling motor should stop, the automatic starting of the auxiliary motor, by utilizing for this purpose kinetic energy derived from one of the operating units.

On the other hand it is usually advantageous to include in the transmission gear between the generator and the two motors, suitable clutches whose torque transmitting capacity is variable as by a centrifugal device, to permit operation of the generator at constant speed, notwithstanding speed variations of the driving motor.

The invention involves the structure, relationships, and combinations pointed out in the following specification and illustrated in the accompanying drawing. It is to be expressly understood, however, that the drawing is for the purpose of illustration only, and is not designed as a definition of the limits of the invention, reference being had to the appended claims for this purpose.

In the drawing:

Fig. 1 is a view, partly in section and partly in elevation, of a device embodying the invention;

Fig. 2 is a view along the line 2—2 of Fig. 1;

Fig. 3 is a view along the line designated "3" in Fig. 1; and

Fig. 4 is a view along the line designated "4" in Fig. 1.

In the drawing a shaft 82 extending through the wall of a casing 55 is rotatably mounted in a bearing 81 provided in said wall and is formed at its outer end with splines 83 for connection with the engine crankshaft 1. A gear 4' is keyed to the portion of the shaft located inside the casing 55 and meshes with a gear 5' mounted on a shaft 6', a free-wheel 7' being interposed between said gear and shaft. Free-wheel 7' is so arranged as to permit shaft 6' to overrun gear 5'. Shaft 6' is rotatably mounted in two bearings 84 located in a partition 85 of casing 55, and supports a drum 9a. The generator 3 is fixed to the outer surface of the wall of casing 55 and its driving shaft is disposed coaxially with shaft 6' and projects within the casing, a plate 12a being fixed to the projecting portion of said driving shaft. Pins 11 corresponding to the pins 11 of Fig. 2 of my prior patent, above identified, are mounted on one side of the plate and extend inside drum 9a. On each of these pins is pivotally mounted a frictional member 10 of the side friction type as shown in Fig. 3, said frictional members 10 being capable of engaging the inner surface of the cylindrical wall of drum 9a; this plate 12a also carries pins 14 and movable weights 13, urged towards the axis by springs 15, and pivotally mounted on these pins, said weights being so connected to frictional members 10 that their outward movement under the action of the centrifugal force tends (as in my prior patent) to bring these members out of contact with drum 9a while their movement towards the center under the action of the springs tends to urge these members against drum 9a. The springs are preferably tension springs which are interposed between the weights and fixation points 16 of plate 12a. This plate is provided on its opposite side with a plurality of segments 44 and of weights 13' (Fig. 4) similar to those described above, but segments 44 are mounted inside a drum 43 fixed to the outer race 86 of a free-wheel 42 assembly, the inner race 87 of which is constituted by the cylindrical outer surface of drum 9a. The free-wheel 42 is such as to permit drum 9a to overrun drum 43, and the weights (and associated springs, anchored to parts 45 corresponding to spring anchorages 16, 16' of my aforesaid patent) which co-operate with segments 44 are so calculated that for a speed slightly lower than the normal driving speed of the generator, their action upon segments 44 moves the latter out of engagement with drum 43.

It will thus be seen that there is provided a double connection between shaft 6' and plate 12a which drives the generator; one connection is effective in both directions and is constituted by the friction clutch comprising members 9a and 10, and the other connection is operative only in one direction and comprises members 9a, 42, 43 and 44.

A small internal combustion engine 2 is mounted on casing 55, adjacent generator 3, and has its shaft 88 coaxial with crankshaft 1 and extending within casing 55. A gear 40, which meshes with a gear 41 carried by drum 43, is fixed to the portion of shaft 88 which extends within the casing. Shafts 89 extend through wheel 40, only one of these shafts being illustrated on the drawing, and are free to rotate. Two pinions 47 and 47b are fixedly connected to each shaft 89, on each side of gear 40. Pinion 47 meshes on the one hand with an inner toothed ring 48 fixedly mounted on the inner surface of the wall of casing 55, in coaxial relation with the shaft of engine 2 and on the other hand with a gear 49 freely mounted on shaft 88 and having its hub 90 projecting out of casing 55; on this projecting portion of hub 90 is mounted a flywheel 50. The unit constituted by the gear 40 carrying the planet gears, the planet gears 47 and the sun gears 48 and 49 constitutes a reduction planetary gear train through which the flywheel 50 is driven at a speed higher than the rotation speed of shaft 88 of engine 2 when the latter is operating.

On the other hand, pinions 47b mesh with an inner toothed ring 51 rotatably mounted in a bearing supported in wall 85 and keyed to a shaft 52 in coaxial relation with crankshaft 1. On this shaft is mounted the slidable member 53 of a gear capable of connecting shaft 52 with shaft 82.

When the device described above is at rest and the engine 2 is being started, the shaft 88 of this engine drives flywheel 50 at high speed through the multiplying planetary gear train 40, 47, 48 and 49. Simultaneously gear 51 is driven by gear 47b and on the other hand gear 40 drives gear 41 and drum 43 carrying the same. As segments 44 are urged against drum 43 by the springs, the drum is drivably connected to plate 12a and rotates the latter which in turn rotates the generator shaft. Drum 43 also rotates drum 9a through free-wheel 42; besides, plate 12a is drivably connected to drum 9a by virtue of the segments 10 being urged by the springs into engagement with drum 9a. Thus, the members 9a, 12a, and 43 rotate as a unit, and also with shaft 6, but without driving gear 5' due to the provision of freewheel 7'. As the speed of the generator approaches the normal driving speed, the weights of the segments 44 move the latter out of contact with drum 43 so that plate 12a is driven from drum 43 only through the now wedged rollers of assembly 42, and connection 9a.

As long as sleeve 53 is not in mesh with shaft 82, the device operates as described, with generator 3 being driven by engine 2.

If sleeve 52 is brought into mesh with shaft 82, shaft 88 drives shaft 82 and crankshaft 1 which is connected to the latter, engine 2 and flywheel 50 then acting as cranking members for crankshaft 1 as in the inertia starters of known type.

As soon as the crankshaft 1 overruns shaft 88, sleeve 53 disengages automatically as known.

When the speed of crankshaft 1 is such that gear 5' overruns shaft 6', free-wheel 7' drives said shaft 6' together with drum 9a fixed to said shaft. This drum 9a tends to overrun drum 43, which action is possible due to the provision of free-wheel 42, and the drive is transmitted to plate 12a through the intermediary of segments 10. Generator 3 is thus driven by shaft 6' rotated by the crankshaft.

The speed of generator 3 thus remains substantially constant due to the fact that every speed increase produces a decrease of the engagement of the segments 10 with drum 9, so that an increased slipping takes place between these segments and their drum.

In the event that (engine 2 being stopped) the main engine 1 slows down to such an extent that the speed of plate 12a becomes lower than that corresponding to disengagement between segments 44 and their drum, these segments move again into contact with drum 43 and rotate the latter, which drives the shaft of engine 2 through gears 41 and 40. The starting of engine 2, which is thus facilitated, enables it to become effective to drive generator 3 independently of main engine 1, the drive being by way of plate 12a as described above. During this independent energization of generator 3 by auxiliary engine 2, the main engine parts 1, 4' and 5' may come to a full stop, if necessary, without in any way interfering with the continuation of the drive from auxiliary engine 2 to the generator 3, the point of over-running being at the rollers of freewheel 7'.

This application is a division of my application No. 206,063, filed May 4, 1938, which is in turn a division of the application, Serial No. 69,558, filed March 18, 1936, from which my patent No. 2,123,219, above referred to, originated.

What I claim is:

1. The combination with a work performing unit, of a pair of centrifugal clutches, each having a drum rotatable with said unit, means interposed between said two drums to transmit torque from one to the other, and thence to the work performing unit, and means for connecting each clutch directly to the work performing unit, whereby torque may be transmitted directly thereto from either clutch, according to whether one or the other is the driver, and means interposed between said two drums to transmit torque from one to the other, and thence to the work performing unit, in response to slippage of one of said clutches, said last-named means including a uni-directional clutch having means integrated with said two drums to constitute the inner and outer races, respectively, of said uni-directional clutch.

2. The combination with a work performing unit, of a pair of centrifugal clutches, each having a drum rotatable with said unit, means for connecting each drum directly to the work performing unit, whereby torque may be transmitted directly thereto from either drum, according to whether one or the other is the driver, means including a normally idle engine for initially energizing both said drums, means including a normally active engine for continuing the energization of one of said two drums, and means including a flywheel in which the energy developed in said normally idle engine may be stored for subsequent transfer to said normally active engine, to produce initial rotation of the latter.

CHARLES RAYMOND WASEIGE.